(12) United States Patent
Jin

(10) Patent No.: US 11,408,481 B2
(45) Date of Patent: Aug. 9, 2022

(54) SHOCK ABSORBER

(71) Applicant: GARISANI., INC, Gyeongsan-si (KR)

(72) Inventor: Il Chan Jin, Daegu (KR)

(73) Assignee: GARISANI., INC, Gyeongsan-si (KR)

( * ) Notice: Subject to any disclaimer, the term of this patent is extended or adjusted under 35 U.S.C. 154(b) by 0 days.

(21) Appl. No.: 17/252,248

(22) PCT Filed: Jun. 28, 2018

(86) PCT No.: PCT/KR2018/007347
§ 371 (c)(1),
(2) Date: Dec. 14, 2020

(87) PCT Pub. No.: WO2020/004689
PCT Pub. Date: Jan. 2, 2020

(65) Prior Publication Data
US 2021/0262547 A1  Aug. 26, 2021

(51) Int. Cl.
*F16F 9/46* (2006.01)
*F16F 9/06* (2006.01)
*F16F 9/43* (2006.01)

(52) U.S. Cl.
CPC ............. *F16F 9/461* (2013.01); *F16F 9/061* (2013.01); *F16F 9/435* (2013.01)

(58) Field of Classification Search
CPC ............. F16F 9/461; F16F 9/061; F16F 9/435
See application file for complete search history.

(56) References Cited

U.S. PATENT DOCUMENTS

| | | | |
|---|---|---|---|
| 4,984,819 A | 1/1991 | Kakizaki et al. | |
| 5,376,135 A * | 12/1994 | Aulie | A61F 2/68 188/322.19 |
| 6,360,857 B1 * | 3/2002 | Fox | F16F 9/3485 188/319.1 |
| 6,672,435 B2 * | 1/2004 | Lemieux | F16F 9/516 188/289 |
| 8,869,959 B2 * | 10/2014 | Yablon | F16F 9/512 188/319.1 |
| 2010/0263971 A1 | 10/2010 | Lee et al. | |
| 2012/0235332 A1 * | 9/2012 | Jordan | F16F 9/461 267/64.26 |

FOREIGN PATENT DOCUMENTS

| | | |
|---|---|---|
| JP | 2741030 B2 | 4/1998 |
| KR | 10-1998-056927 A | 9/1998 |
| KR | 10-1999-0049112 A | 7/1999 |
| KR | 10-0311864 B1 | 12/2001 |
| KR | 10-2010-0065583 A | 6/2010 |
| KR | 10-2010-0114821 A | 10/2010 |

OTHER PUBLICATIONS

International Search Report for PCT/KR2018/007347 dated Mar. 21, 2019 from Korean Intellectual Property Office.

* cited by examiner

*Primary Examiner* — Melody M Burch
(74) *Attorney, Agent, or Firm* — Revolution IP, PLLC

(57) ABSTRACT

A shock absorber includes: a cylinder which is filled with a fluid; a piston valve which includes a valve seat dividing an inner space of the cylinder, a passage which is formed in the valve seat and through which the fluid passes, and a valve disposed to cover the passage and interfering with a flow of the fluid; a performance controller which is disposed in the cylinder to control at least one of a spring constant, a damping force, or a combination thereof; and a piston support which is connected to the piston valve and exposed to an outside.

11 Claims, 5 Drawing Sheets

SHOCK ABSORBER

CROSS REFERENCE TO PRIOR APPLICATIONS This application is the 35 U.S.C. 371 national stage of International application PCT/KR2018/007347 filed on Jun. 28, 2018. The entire contents of each of the above-identified applications are hereby incorporated by reference.

BACKGROUND OF THE DISCLOSURE

Field of the disclosure

The present disclosure relates to a shock absorber, and more particularly, to a shock absorber which is filled with a fluid therein and attenuates vibration while the fluid passes through a piston valve by an external force.

Related Art

A suspension refers to a support device for a vehicle such as an automobile, and is also referred to as a suspension device. The suspension is generally constituted by shock absorber, that is, a shock dampener, also called a spring and a damper. In general, the spring determines the stroke of the suspension, and the shock dampener determines a moving speed of the suspension. The biggest factor that determines a degree of softness and hardness of the suspension is a spring constant, and the shock absorber converts vibration energy of the spring into thermal energy to generate damping force.

In general, a technology of the shock absorber in the related art is a mono-tube type absorber, in which a piston rod (hereinafter, referred to as a "rod") is connected to a vehicle body, and a cylinder portion is connected to an axle (wheel). Of course, the piston rod may be connected to the axle and the cylinder portion may be connected to the vehicle body. However, in this case, there may be a disadvantage in that the center of gravity is located at the top due to a load of the cylinder portion.

A liquid chamber filled with an incompressible liquid (that is, oil) and a gas chamber filled with a compressible fluid (that is, nitrogen or air) are configured inside the cylinder, and a free piston is disposed therebetween to isolate the liquid chamber and the gas chamber. In most of the shock absorbers, the gas chamber is installed to suppress cavitation.

The piston valve generates a flow resistance of a liquid in strokes of a compression phase (bump) and an expansion phase (rebound) of the shock absorber, and generates a damping force by using this flow resistance. According to a stroke of the rod, an internal volume of the liquid chamber increases or decreases as much as a stroke volume of the rod. Since the liquid is incompressible, the compressible fluid (that is, gas) increases and decreases by this volume. In other words, the gas chamber performs a function of compensating for a volume change of the liquid chamber according to the volume of the rod flowing into the liquid chamber. In addition, the gas chamber is filled with the gas having a pressure pressurized to some extent to suppress the cavitation of the liquid chamber. That is, the gas chamber plays a role of compensating the volume according to the compression phase and the expansion phase and suppressing the cavitation of the liquid. In addition, the gas chamber has some spring constant during the compression phase and expansion phase due to a limited volume of the gas chamber.

As a technology of the related art related to the shock absorber, there are a "gas-enclosed shock absorbing device" disclosed in Korean Patent Publication No. KR 10-1998-056927 and a "suspension device" disclosed in Korean Patent No. KR 10-0311864.

SUMMARY OF THE DISCLOSURE

The present disclosure provides a technology that enables a user to control performance of a shock absorber to desired performance, and provides a technology that allows a user to easily control performance of a shock absorber.

The present disclosure also provides a technology which allows a user to electively control a spring constant and a damping force to control performance of a shock absorber, and allows a user to control passages through which a fluid flows so that functions of the passages can complement each other.

According to an embodiment of the present disclosure, there is provided a shock absorber.

The shock absorber includes a cylinder which is filled with a fluid; a piston valve which includes a valve seat dividing an inner space of the cylinder, a passage which is formed in the valve seat and through which the fluid passes, and a valve disposed to cover the passage and interfering with a flow of the fluid; a performance controller which is disposed in the cylinder to control at least one of a spring constant, a damping force, or a combination thereof; and a piston support which is connected to the piston valve and exposed to an outside.

The performance controller may include an interference controller which is disposed in the piston valve and controls a valve interfering with the flow of the fluid.

The interference controller may include a valve interference unit which is disposed inside the cylinder to freely move and controls a range of change of the valve, an interference guide which is disposed inside the cylinder to guide the valve interference unit in a direction in which the valve is changed, and an interference fixing unit which is disposed to be in contact with the valve interference unit to fix the valve interference unit.

The valve interference unit may include an interference limiter which is in contact with a surface in the direction in which the valve is changed so that the valve is changed up to the interference fixing unit.

The valve may be configured to be separated from the valve seat, and the valve interference unit includes an interference coupler which is freely moved by combining with the valve so that the valve is separated from the valve seat to the interference fixing unit.

The interference fixing unit may include an interference male thread formed in the interference guide, and an interference female thread formed in the valve interference unit to correspond to the interference male thread, and the valve interference unit may move according to a screwing direction.

The interference fixing unit may include an interference male thread formed in the interference guide, a limiting fixing protrusion formed to be in contact with the valve interference unit, and an interference female thread formed in the limiting fixing protrusion to correspond to the interference male thread, and the limiting fixing protrusion may move according to a screwing direction.

The interference controller may include an elastic body disposed between the valve interference unit and the interference fixing unit.

The shock absorber may further include: an external controller of which one side is inserted into the cylinder to rotate freely and rotates the valve interference unit or the interference fixing unit from an outside of the cylinder.

The external controller may include a compression external control rod which is formed of a tube body and corresponds to the valve interference unit or the interference fixing unit disposed above the valve seat, and an expansion external control rod which is inserted into the compression external control rod to pass through the valve seat and corresponds to another valve interference unit or interference fixing unit disposed below the valve seat.

The shock absorber may further include: a fixing protrusion which protrudes to a side surface exposed to an outside of an external control rod; and a fixing cap which surrounds the external control rod and includes a fixing portion which is caught on the fixing protrusion.

The performance controller may include a volume changer which is disposed on a side surface of the cylinder and freely moves inside the cylinder, and a spring constant may be changed according to a volume change inside the cylinder.

The performance controller may include a filling valve which is disposed on a side surface of the cylinder and communicates with an inside of the cylinder so that the cylinder is filled with the fluid, and a spring constant may be changed according to a pressure of a gas generated by the injected fluid. The piston valve may further include a pressure reducing valve to prevent an increase in damping force.

The above description provides only optional concepts in a simplified form for matters to be described in more detail later. The present disclosure is not intended to limit the main features or essential features of the claims or to limit the scope of the claims.

DESCRIPTION OF EXEMPLARY EMBODIMENTS

Figure 1:
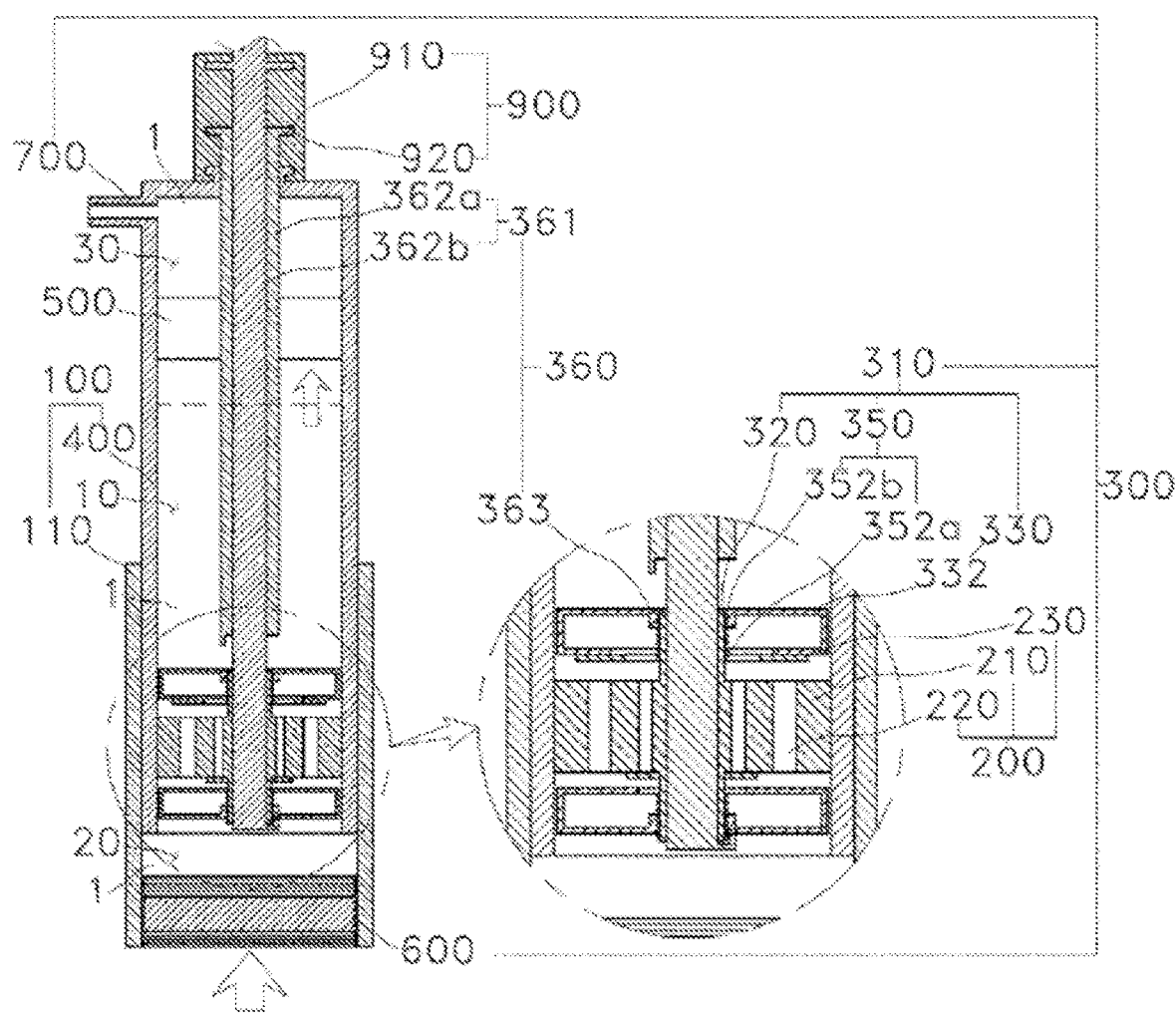
FIG. 1 is a view illustrating an embodiment of a shock absorber disclosed in the present disclosure.

Hereinafter, embodiments disclosed in the present disclosure will be described in detail with reference to the drawings. Unless otherwise specified in the present specification, similar reference numbers in the drawings indicate similar components. Exemplary embodiments described in the detailed description, drawings, and claims are not intended to be limiting, and other embodiments may be used, and other changes may be made without departing from a spirit or scope of a technology disclosed herein. A person skilled in the art will be easy to understand that components of the present disclosure, that is, components generally described herein and described in the drawings may be arranged, configured, combined, and designed in various different configurations, all of which are clearly devised and form a part of the present disclosure. In the drawings, in order to clearly express various layers (or films), regions, and shapes, a width, length, thickness, or shape of a component may be exaggerated.

When one component is referred to as "disposition" to another component, it may include a case where an additional component is interposed between them, as well as a case where the one component is directly disposed on the other component.

When one component is referred to as "connection" to another component, it may include a case where an additional component is interposed therebetween, as well as a case where the one component is directly connected to the other component.

When one component is referred to as "formation" to another component, it may include a case where an additional component is interposed therebetween, as well as a case where the one component is directly formed on the other component.

When one component is referred to as "coupling" to another component, it may include a case where an additional component is interposed therebetween, as well as a case where the one component is directly coupled to the other component.

Since description of a disclosed technology is merely an embodiment for structural or functional description, a scope of rights of the disclosed technology should not be construed as being limited by the embodiments described in the present specification. That is, since the embodiments can be variously changed and have various forms, the scope of rights of the disclosed technology should be understood as including equivalents capable of realizing the technical idea.

Expressions in the singular are to be understood as including the plural expressions, unless the context clearly indicates otherwise, and it is to be understood that terms such as "include" or "have" are intended to designate the presence of implement feature, number, step, action, component, part, or combination thereof, and do not preclude possibility of the presence or addition of one or more other features, numbers, steps, actions, components, parts, or combinations thereof.

All terms used herein have the same meaning as commonly understood by one of ordinary skill in the field to which the disclosed technology belongs, unless otherwise defined. As defined in a commonly used dictionary, terms should be construed as being consistent with the meaning of the related technology, and cannot be construed as having an ideal or excessive formal meaning unless explicitly defined in the present application.

Figure 2:
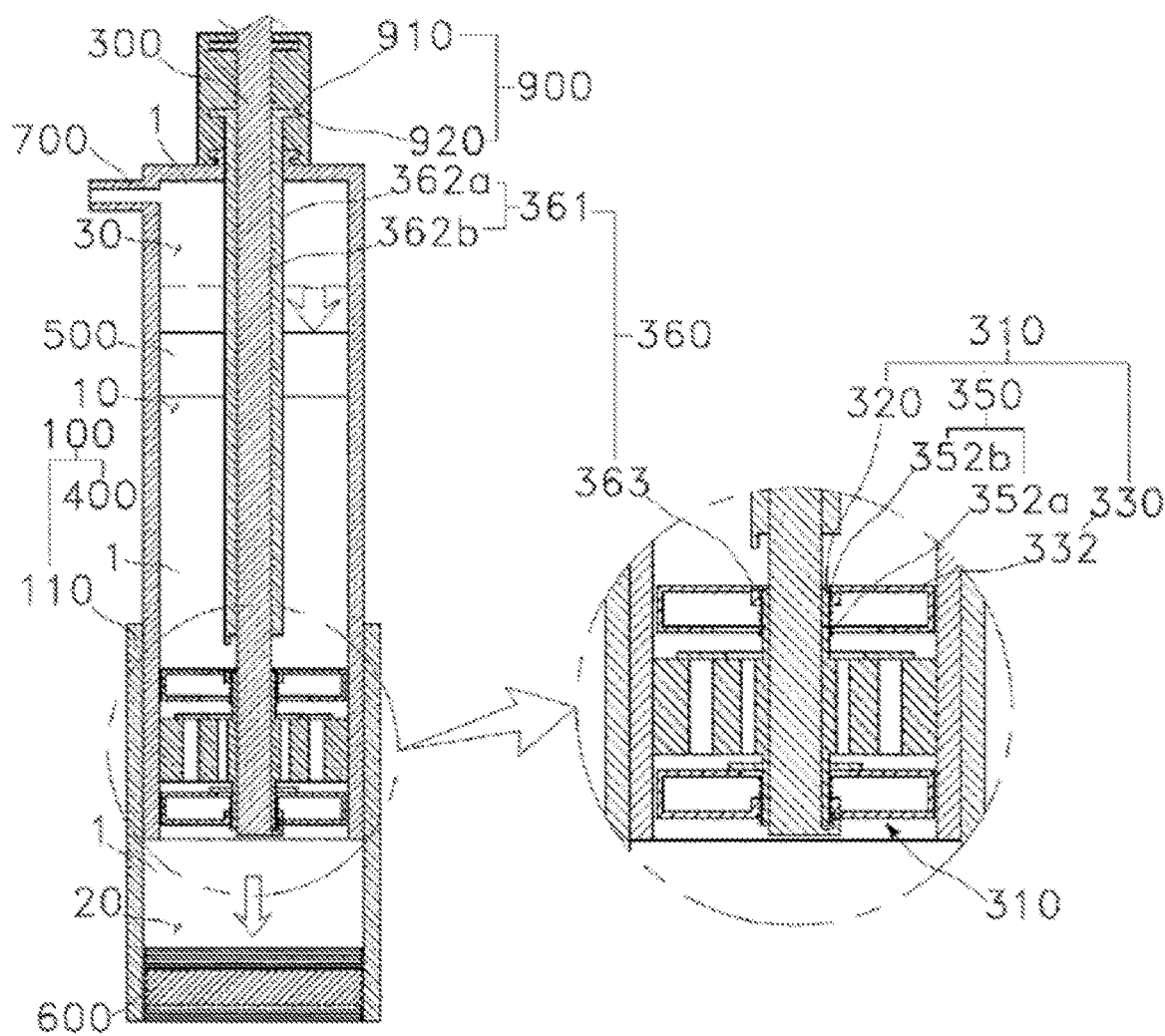
FIG. 2 is a view illustrating another operating state of an embodiment of the shock absorber disclosed in the present disclosure.
Figure 3:
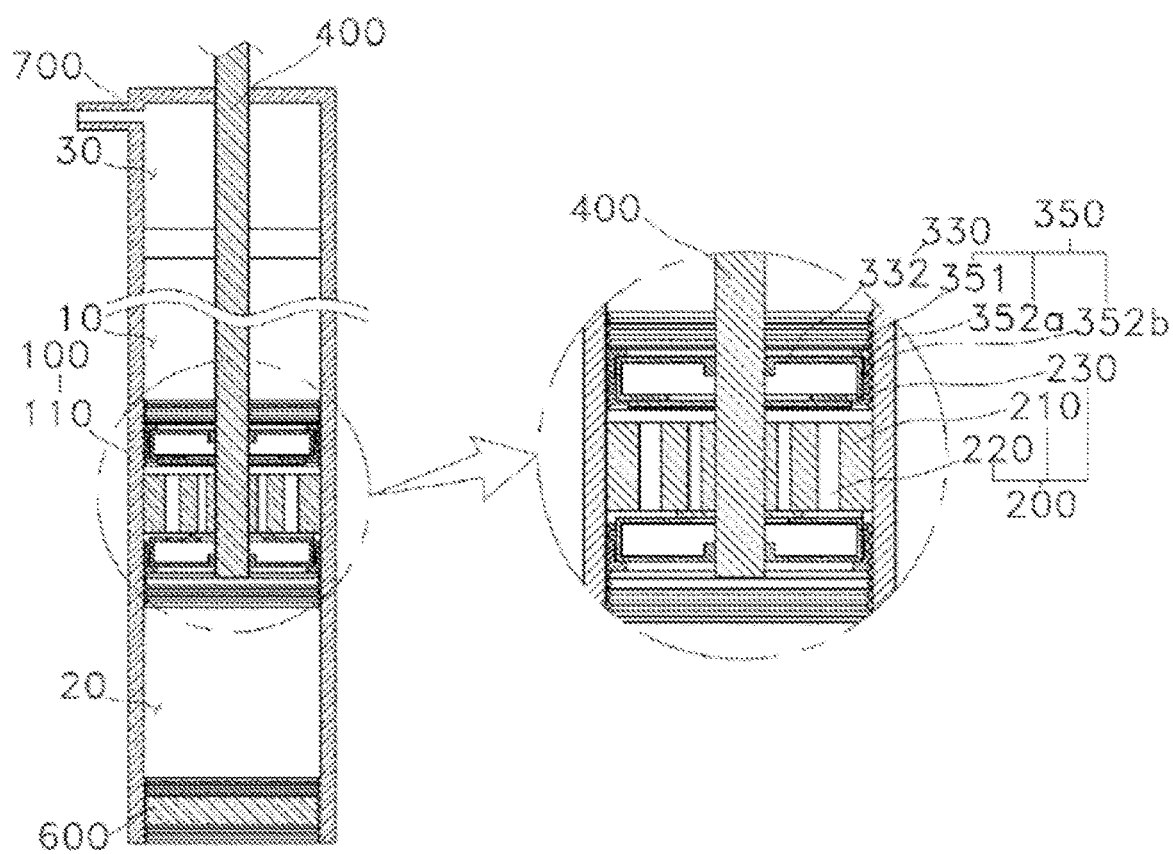
FIG. 3 is a view illustrating another embodiment of a shock absorber disclosed in the present disclosure.
Figure 4:
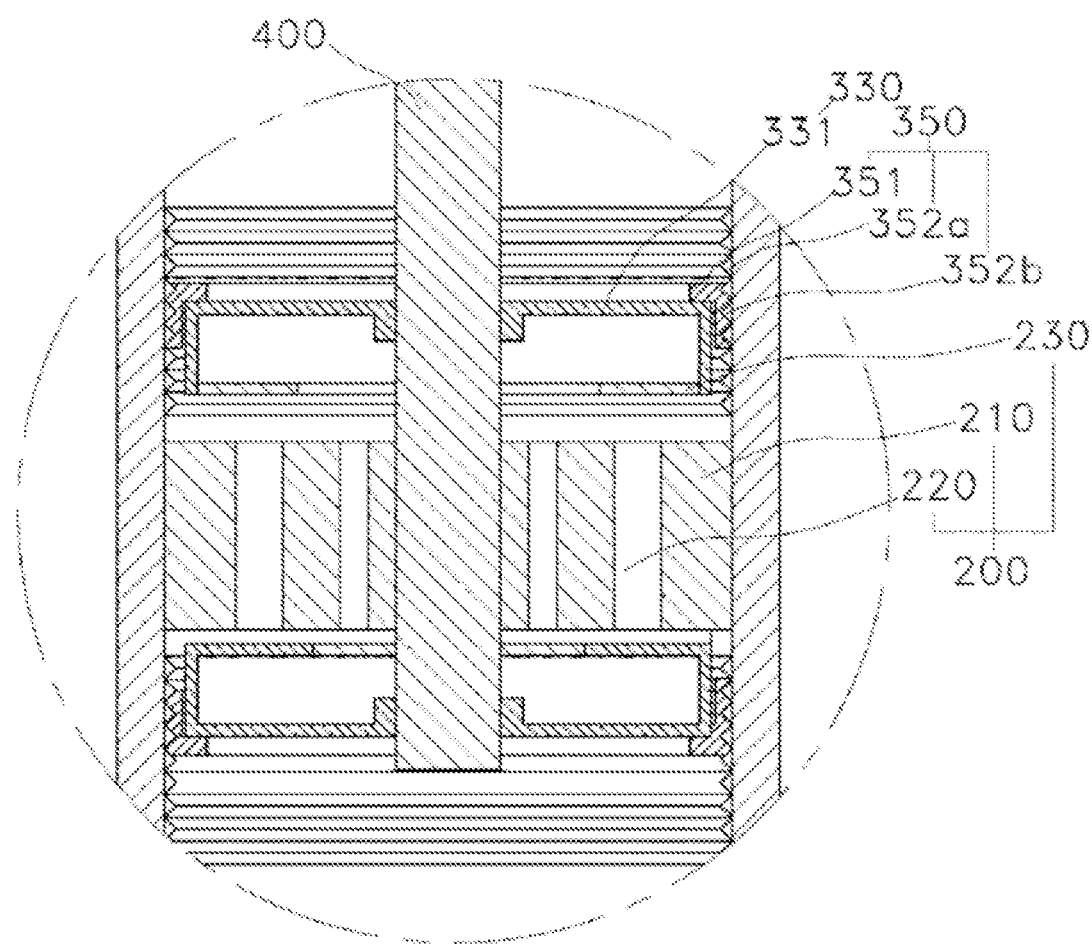
FIG. 4 is a view illustrating another embodiment of a performance controller disclosed in the present disclosure.
Figure 5:
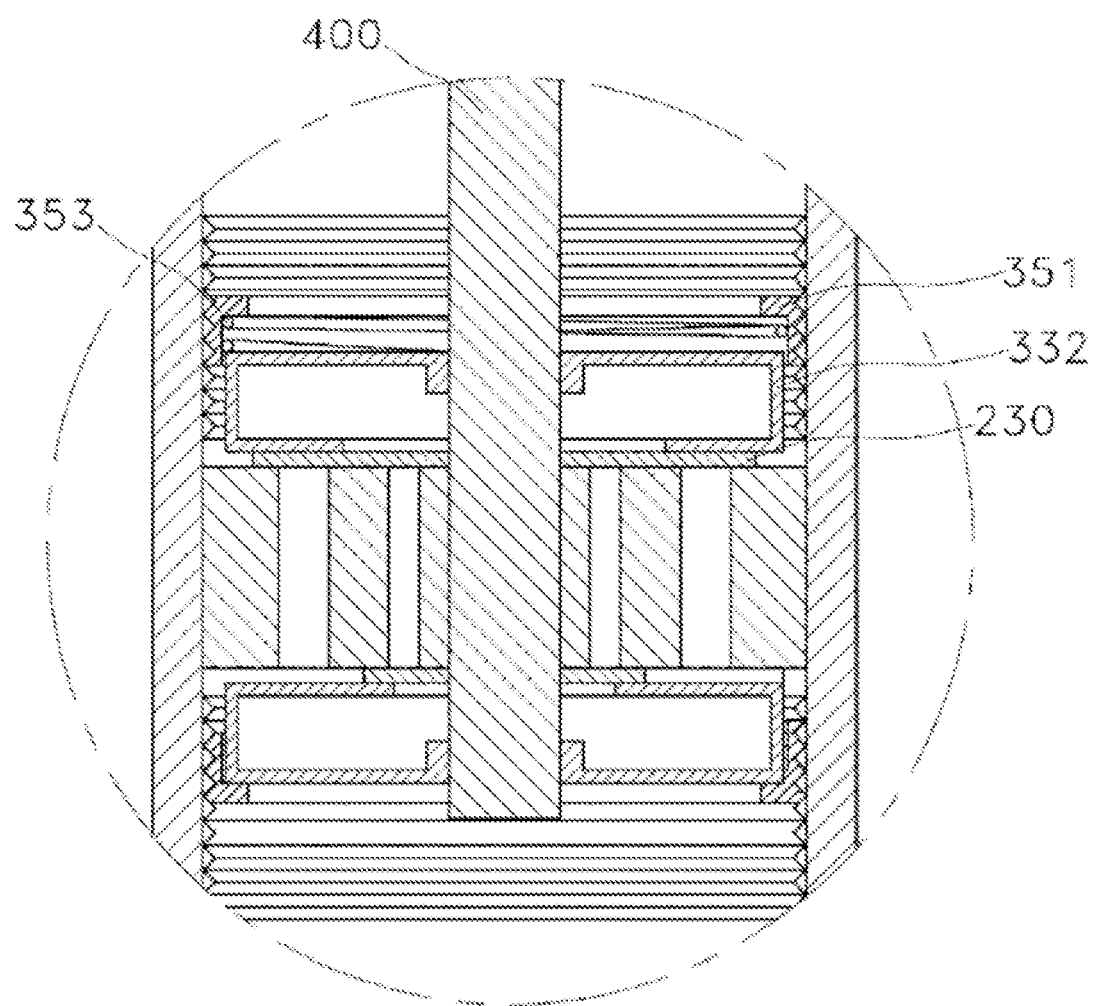
FIG. 5 is a view illustrating another embodiment of the performance controller disclosed in the present disclosure.

In the present disclosure, FIG. 1 is a view illustrating an embodiment of a shock absorber disclosed in the present disclosure. FIG. 2 is a view illustrating another operating state of an embodiment of the shock absorber disclosed in the present disclosure. FIG. 3 is a view illustrating another embodiment of a shock absorber disclosed in the present disclosure. FIG. 4 is a view illustrating another embodiment of a performance controller disclosed in the present disclosure. FIG. 5 is a view illustrating another embodiment of the performance controller disclosed in the present disclosure.

The shock absorber disclosed in the present disclosure includes a cylinder 100, a piston valve 200, a performance controller 300, and a piston support 400.

The performance controller 300 may optionally include an interference controller 310, a volume changer 600, and a filling valve 700.

The interference controller 310 may include a valve interference unit 330, an interference guide 320, and the interference fixing unit 350.

The valve interference unit 330 may optionally include an interference limiter 332 and an interference coupler 331.

The interference fixing unit 350 may optionally include a valve interference unit 330 and a limiting fixing protrusion 351 which are screwed with the interference guide 320.

The interference controller 310 may optionally include an elastic body 353 and an external controller 360.

The external controller 360 may optionally include a compression external control rod 362a, an expansion external control rod 362b, and a fixing cap 900.

The fixing cap 900 may include a fixing protrusion 910 and a fixing portion 920.

The shock absorber disclosed in the present disclosure may optionally include a pressure reducing valve.

Hereinafter, the shock absorber disclosed in the present disclosure will be described in detail with reference to the accompanying drawings.

As embodiments disclosed in FIGS. 1 to 6, the shock absorber disclosed in the present disclosure includes the cylinder 100 filled with a fluid 1, the piston valve 200 which includes the valve seat 210 dividing an inner space of the cylinder 100, a passage 220 which is formed in the valve seat 210 and through which the fluid 1 passes, and a valve 230 disposed to cover the passage 220 and interfering with a flow of the fluid 1, the performance controller 300 which is disposed in the cylinder 100 to control at least one of a spring constant, a damping force, or a combination thereof, and a piston support 400 which is connected to the piston valve 200 and exposed to an outside. In this shock absorber, the spring constant or damping force is controlled by the performance controller 300, and thus, the user can control the performance of the shock absorber.

The cylinder 100 is configured to be sealed in a state filled with the fluid 1.

A in the embodiment disclosed in FIGS. 1 to 2, the cylinder 100 may include a first cylinder 110 formed in one open shape, and the piston support 400 which is inserted into the first cylinder and is formed in to a tubular shape of which one side is open. The first cylinder 110 may be connected to an impact portion such as a wheel of a vehicle body where an external force is generated, and the piston support 400 may be connected to a body such as the vehicle body through which an external force is attenuated and transmitted. The inside of the cylinder 100 is filled with the fluid 1, and when an external force is applied to the cylinder 100, the first cylinder 110 may be moved along the piston support 400. An external force is attenuated by the flow resistance of the fluid 1 through the piston valve 200 to be described below. Meanwhile, the first cylinder 110 may be connected to the impact portion, and in the case, the piston support 400 may be connected to the body. The cylinder 100 of the present embodiment is suitable when implementing the configurations of the volume changer 600 and the filling valve 700 of the performance controller 300 to be described below.

In the cylinder 100 in FIG. 3 illustrating another embodiment, the first cylinder 110 is formed in a completely sealed form, and the cylinder includes the piston support 400 which is formed in a rod shape and one side which passes through the first cylinder 110 to extend to the inside of the cylinder 100. The inside of the first cylinder 110 is filled with the fluid 1, and the piston support 400 may be connected to the piston valve 200 to be described below. The first cylinder 110 may be connected to the body such as the vehicle body through which an external force is attenuated and transmitted, and in this case, the piston support 400 may be connected to an impact portion such as a wheel of a vehicle body where an external force is generated. The inside of the cylinder 100 is filled with a fluid, and when an external force is applied to the cylinder 100, the external force is attenuated through the piston valve 200 to be described below. Meanwhile, the first cylinder 110 may be connected to the impact unit, and in this case, the piston support 400 may be connected to the body. The cylinder 100 of the present embodiment is suitable when implementing the configurations of the volume changer 600 and the filling valve 700 of the performance controller 300 to be described below.

The piston valve 200 includes the valve seat 210 dividing the inner space of the cylinder 100, the passage 220 which is formed in the valve seat 210 and through which the fluid 1 passes, and the valve 230 disposed to cover the passage 220 and interfering with the flow of the fluid 1. The piston valve 200 is coupled to the piston support 400. The piston valve 200 interferes with the flow of the fluid 1 when the fluid 1 passes through the piston valve 200 by an external force. That is, the piston valve 200 causes the fluid 1 moving through the passage 220 to generate resistance by the valve 230.

As in the embodiment disclosed in FIGS. 1 to 2, the piston valve 200 may include the valve seat 210 which divides the inner space of the cylinder 100 filled with the fluid 1 into at least a first space 10 and a second space 20. At least one passage 220 through which the fluid 1 divided into the first space 10 and the second space 20 passes freely may be included in the valve seat 210. An upper surface of the valve seat 210 includes the valve 230 which is disposed so as to cover the passage 220 and interferes with the flow of the fluid 1. In the piston valve 200, the flow of the fluid 1 passing through the passage 220 generate a resistance due to the inference with the valve 230, and thus, a damping force.

In addition, two or more passage 220 may be formed, each of the valves 230 is disposed one by one in one passage 220 in two or more passages 220, and the valves 230 may be respectively disposed on an upper surface and a lower surface of the valve seat 220. Here, the valve seat 210 may be formed to have the same size as an inner diameter of the cylinder 100.

The passage 220 may be arranged in a circular shape divided into outer and inner sides in a plan view of the valve seat 210. Here, the valve 230 disposed on the lower surface of the valve seat 210 is disposed in the passage 220 arranged inward of the valve seat 210, and another valve 230 disposed on the upper surface of the valve seat 210 may be disposed in the passage 220 arranged outward of the valve seat 210.

Meanwhile, the disposition positions of the valve seat 210 may be changed to each other.

In the passage 220 and the valve 230 disposed in this way, the cylinder 100 is moved by an external force applied to the shock absorber, and a distance between the valve seat 210 and an inner surface of the cylinder 100 is changed. In a compression store illustrated in FIG. 1 when the valve seat 210 and a lower portion of the cylinder 100 is close to each other, the fluid stored in the second space 20 formed below the valve seat 210 moves to the passage 220 corresponding to the valve 230 disposed on the upper surface of the valve seat 210. The valve 230 disposed below the valve seat 210 moves upward according to the movement of the fluid 1 and comes into contact with the valve seat 210 to block the passage 220. In this case, the valve 230 disposed on the upper surface of the valve seat 210 is lifted by a force generated when the fluid 1 moves, and the outer passage 220 is opened. In the opposite case, as illustrated in FIG. 2, the valve 230 disposed on the upper surface of the valve seat 210 blocks the outer passage 220, and the fluid 1 moves through the inner passage 220 corresponding to the valve 230 disposed on the lower surface of the valve seat 210.

In addition, an end of the piston support 400 may be coupled to the upper portion of the valve seat 210. When an external force acts on the piston valve 200 coupled in this way through the first cylinder 110, as illustrated in FIG. 1, the first cylinder 110 is moved upward along the piston support 400. In this case, the fluid 1 filling the second space 20 passes through the passage 220 and flows into the first space 10. The flow of the fluid 1 moving to the first space 10 interferes with the valve 230, and thus, a damping force is generated by the interference.

Meanwhile, the piston valve 200 may further include the pressure reducing valve to prevent the damping force from increasing a certain level or more when operating at a specific speed or higher.

In the piston valve 200 of FIG. 3 illustrating another embodiment, the end of the piston support 400 may be coupled to the center of the valve seat 210. When an external force acts on the piston valve 200 coupled in this way through the piston support 400, the piston support 400 pushes the piston valve 200 and the piston support 400 moves upward along the first cylinder 110. In this case, the fluid 1 filling the second space 20 passes through the passage 220 and flows into the first space 10 and moves to the first space 10. The flow of the fluid 1 moving to the first space 10 is interfered with the valve 230, and thus, a resistance is generated by the interference. This resistance eventually generates a damping force which attenuates a moving speed of the piston support 400.

Meanwhile, the valve 230 may be formed of a material having elasticity, and any one side of the valve 230 may be disposed to be fixed to the valve seat 210 and functions to restore the opened valve 230. The valve 230 disposed in this way is opened according to the flow of the fluid 1 moving through the passage 220, and a flow resistance of the fluid 1 moving through the passage 220 may be changed according to an opening amount (stroke, lift) of the valve 230.

The performance controller 300 is disposed in the cylinder 100 and is configured to control at least one of a spring constant, a damping force, or a combination thereof. The performance controller 300 may optionally include the interference controller 310 capable of controlling the damping force, and the volume changer 600 and the filling valve 700 capable of controlling the spring constant.

The interference controller 310 is disposed on the valve seat 210 and is configured to control the opening amount of the valve 230. The interference controller 310 is fixed at a specific position while freely moving upward and downward and controls a range of deformation such as separation or bending of the valve 230 from the passage 220 to limit the opening amount.

The interference controller 310 includes the interference guide 320 protruding circularly from the upper and lower surfaces of the valve seat 210, as in the embodiment disclosed in FIGS. 1 to 2. Moreover, the interference controller 310 includes the interference limiter 332 having a circular shape which can come into contact with the upper surface of at least one valve 230. A hole having a size inserted into the interference guide 320 is formed at the center of the interference limiter 332. The interference limiters 332 are respectively inserted into the interference guides 320 and can be freely moved upwards and downwards. In addition, the interference controller 310 includes the interference fixing unit 350 to fix the position of the interference limiter 332. The interference controller 310 limits the deformation range of the valve 230 separated from the valve seat 210 by the interference limiter 332 having the position fixed by the interference fixing unit 350. That is, the deformation range of the valve 230 is limited by the distance that the interference limiter 332 moves upward and downward, and thus, an opening area of the passage (opening amount of the valve 230) is controlled. Therefore, the damping force is controlled.

Meanwhile, the interference controller 310 may be implemented by replacing the valve 230 which is separated after being in contact with the valve seat 210, and when the valve 230 is formed of a material which is bent according to the movement of the fluid 1, the interference controller 310 limits the range of deformation (the opening amount of the valve 230) in which the valve 230 is bent. The shock absorber disclosed in the present disclosure may be implemented by combining the partially fixed elastic valve 230 and the valve 230 separated from the valve seat 210 with each other. In addition, shapes of the interference guide 320, the valve 230 corresponding to the interference guide 320, and the interference limiter 332 may be variously modified and implemented.

The interference controller 310 in FIG. 3 illustrating another embodiment is formed in a circular shape that can be in contact with the upper surface of at least one valve 230, and includes the interference limiter 332 formed to have a size inserted into the piston support 400 at the center thereof. The interference limiter 332 is inserted into the piston support 400 and can be freely moved upward and downward. In the present embodiment, the piston support 400 serves to support the piston valve 200 and simultaneously serves as the interference guide 320. In addition, the interference controller 310 includes the interference fixing unit 350 to fix the position of the interference limiter 332. The interference controller 310 limits the deformation range of the valve 230 separated from the valve seat 210 by the interference limiter 332 having the position fixed by the interference fixing unit 350. That is, the deformation range of the valve 230 is limited by the distance that the interference limiter 332 moves upward and downward, and thus, the opening area of the passage is controlled.

Meanwhile, the interference controller 310 may be implemented by replacing the valve 230 which is separated after being in contact with the valve seat 210, and may be implemented by combining the partially fixed elastic valve 230 and the valve 230 separated from the valve seat 210 with each other. In addition, shapes of the piston support 400, the valve 230 corresponding to the piston support 400, and the interference limiter 332 may be variously modified and implemented. In the present embodiment, the piston support 400 serves to support the piston valve 200 and simultaneously serves as the interference guide 320.

In the interference controller 310 in FIG. 4 illustrating another embodiment, the piston support 400 coupled to the valve seat 210 in which the valve 230 is disposed may be replaced with the interference guide 320. The interference coupler 331 may be provided, which inserted into the piston support 400 and coupled with the valve 230 and are fixed while being freely moved along the interference guide 320 to separate the valve 230 from the passage 220. In addition, the interference fixing unit 350 is provided to fix the position of the interference coupler 331. The interference controller 310 control a distance between the passage 220 and the valve 230 by moving the valve 230 away from or in contact with the passage 220. That is, the valve 230 can be maintained in a state away from all passages 220 through the interference coupler 331, the valve 230 disposed above the valve seat 210 or another valve 230 disposed below the valve seat 210 is selected to open the passage 220 in both the expansion stroke and compression stroke, or to optionally open the passage 220 in the expansion stroke or the compression stroke. In the present embodiment, preferably, the valve 230 is implemented limited to the valve 230 configured to be separated from the valve seat 210.

Further, the interference controller 310 may be implemented by optionally combining the interference limiter 332 and the interference coupler 331. For example, the interference limiter 332 is configured above the valve seat 210, the inference coupler 331 is configured below the valve seat 220, and when the valve 230 is set to be a state of being spaced apart from the passage 220 through the interference coupler 331, the fluid 1 can flow through all passages 220 during the compression stroke and the expansion stroke of the cylinder 100. That is, the damping force can be controlled more widely.

The interference fixing unit 350 is configured to fix or change the position of the interference controller 310.

As in the embodiment disclosed in FIGS. 1 to 2, the interference fixing unit 350 may include an interference male thread 352a which is formed an outer surface of the interference guide 320 and an interference female thread 352b which is formed on the interference limiter 332 inserted into the interference guide 320 to correspond to the interference male thread 352a. In the interference fixing unit 350, when the interference limiter 332 is screwed to the interference guide 320 so that the interference limiter 332 rotates forward, the interference limiter 332 is moved downward, and when the interference unit 332 rotates rearward, the interference limiter 332 may be moved upward and fixed. That is, the position of the interference limiter 332 can be controlled through the interference fixing unit 350.

Meanwhile, as illustrated in FIG. 3, the interference male thread 352a may be included inside the cylinder 100 and the interference female thread 352b may be included on the surface of the interference limiter 332.

Further, a screwing structure of the interference controller 310 may be configured to be screwed with the valve seat 210.

The interference fixing unit 350 in FIG. 3 illustrating another embodiment includes the limiting fixing protrusion 351 protruding so that the side surface of the interference limiter 332 is caught on the inner surface of the cylinder 100. An interference thread 253 is provided on the inner surface of the limiting fixing protrusion 351, and the interference female thread 352b is provided on the inner surface of the cylinder 100. The interference fixing unit 350 may be moved upward and downward by screwing the limiting fixing protrusion 351 and the cylinder 100. That is, the interference limiter 332 may be moved as much as the distance at which the limiting fixing protrusion 351 is moved upward and downward, and thus, a deformable space of the valve 230 may be controlled.

Meanwhile, as illustrated in FIG. 5, the elastic body 353 may be further provided between the limiting fixing protrusion 351 and the interference limiter 332, and the interference limiter 332 may be configured to be moved by a spring constant. Of course, the elastic body may also be provided in the interference coupler 331. In addition, the elastic bodies may be disposed above and below the valve seat 210, respectively.

The interference controller 310 described above can change the resistance value which interferes with the flow of the fluid 1 flowing during the compression stroke and the expansion stroke of the cylinder 100 according to a situation. Accordingly, the interference controller 310 predicts a force applied externally (shock or vibration) and controls the position of the interference limiter 332, and thus, the space between the passage 220 and the valve 230 is controlled, and a resistance value with respect to the flow of the flowing fluid 1 is controlled. For example, when implementing performance of a hard shock absorber required for high-speed driving of a vehicle, the positions of the interference limiter 332 of the interference controller 310, or the interference coupler 331 and the limiting fixing protrusion 315 decreases so that the range of change of the valve 230 disposed on the upper surface of the valve seat 210 decreases, and thus, the hard shock absorber is implemented. Conversely, when implementing performance of a soft shock absorber so that a stable ride comfort of the vehicle is required, the positions of the interference limiter 332 of the interference controller 310, or the interference coupler 331 and the limiting fixing protrusion 315 increase so that the range of change of the valve 230 disposed on the upper surface of the valve seat 210 increases, and the soft shock absorber is implemented.

In addition, in the shock absorber disclosed in the present disclosure, the interference controllers 310 capable of controlling the ranges of change of the valve 230 disposed on the upper surface of the valve seat 210 in charge of the damping force during the compression stroke implemented in a general shock absorber and another valve 230 disposed on the lower surface of the valve seat 210 in charge of the damping force during the expansion stroke can be respectively disposed, and thus, the damping force can be set in each of the expansion stroke and the compression stroke. It is possible to independently control the damping force during the expansion and compression strokes, more diverse performance of the shock absorber can be implemented.

Further, in the shock absorber disclosed in the present disclosure, all passages 220 formed in the valve seat 210 can be opened through the interference coupler 331 of the interference controller 310. Accordingly, depending on a situation, all passages 220 can be used as the passage through which the fluid 1 flows during the expansion stroke or compression stroke.

Meanwhile, the size and shape or position of the interference guide 320 and the interference limiter 332 are limited only for easy explanation of the shock absorber disclosed in the present disclosure, and the sizes, formations, and positions can be variously changed. Moreover, instead of the interference male thread 352a and the interference female thread 352b suggested as the method for fixing the position of the interference limiter 332, a magnetic body moving upward and downward may be provided inside the interference guide 320, and thus, the interference limiter 332 may be moved or fixed by a magnetic force. In addition, the interference guide 320 and the interference limiter 332 may be provided only on the upper surface of the valve seat 210 to control the valve 230 only in the compression stroke, and the interference guide 320 and the interference limiter 332 may be provided only on the lower surface of the valve seat 210. In addition, the interference limiter 332 may have a size corresponding to at least a portion of the passage 220. The interference limiter 332 may implement a more precise damping force by limiting an area in which the valve 230 formed of an elastic material is bent by the flow of the fluid 1 passing through the passage 220.

The volume changer 600 of the performance controller 300 is disposed on the side surface of the cylinder 100 and is configured to move freely into the cylinder 100. The volume changer 600 may change the spring constant according to the volume change inside the cylinder 100.

In the volume changer 600 according to the embodiment disclosed in FIG. 1, the first cylinder 110 is formed in a tube shape, a male thread is formed in an inner surface of one end of the first cylinder 110, a female thread corresponding to the male thread of the first cylinder 110, and one side of the first cylinder 110 is closed. The volume changer 600 is moved upward and downward inside the first cylinder 110 according to the direction in which the screw is coupled, and thus, the internal volume of the first cylinder 110 may be changed.

Meanwhile, the volume changer 600 is arranged to be freely moved inside the piston support 400 as illustrated in FIG. 1, includes a free piston 500 which divides the first space 10 into two space to partition a third space 30, the fluid 1 filling the third space 30 is a gas, and the fluid 1 filling the first space 10 and the second space 20 is a liquid.

Here, the volume changer 600 substantially changes the volume of the second space 20, the volume filled with the liquid is reduced, and thus, the third space 30 filled with the compressible gas is compressed by the free piston 500 to compress the gas. In this case, the spring constant varies depending on a degree of compression of the gas.

Further, the volume changer 600 may be disposed to be connected to the third space 30 to directly compress the fluid 1 filling the third space 30, or the third space 30 or another pre-piston 500 is disposed to divide the third space 30 to form another space and the volume changer 600 may be disposed to be connected to the space.

The filling valve 700 of the performance controller 300 is disposed on the side surface of the cylinder 100 to communicate with the inside of the cylinder 100, and thus, the fluid 1 can fill the cylinder 100. The filling valve 700 changes the spring constant according to a compression rate of the gas by the fluid 1 to be injected.

As in the embodiment disclosed in FIG. 1, one side of the piston support 400 includes a general valve device capable of injecting or discharging gas. The valve device is disposed on the side surface of the cylinder 100 and is connected to the third space 30. The filling valve 700 receives the same gas as the gas filling the third space 30 from the outside and injects or discharges the gas into the third space 30 to control the pressure in the third space 30. As a result, it is possible to control the spring constant value of the shock absorber.

Meanwhile, the filling valve 700 may be disposed in the first space 10 or the second space 20 to inject or discharge a liquid. Of course, preferably, the filling valve 700 is applied to the shock absorber including the third space 30 filled with gas, such as the volume changer 600.

The external controller 360 is inserted into the cylinder 100 and is freely rotated to rotate the valve interference unit 330 or the interference fixing unit 350 outside the cylinder 100.

In more detail, the external controller 360 is formed in a rod shape, and includes the external control rod 361 partially protruding on one side. Moreover, an external control groove 363 is provided, which is formed on one surface of the screw-connected valve interference unit 330 or the limiting fixing protrusion 351 of the interference fixing unit 350 and corresponds to the external control rod 361. When the external controller 360 easily rotates a portion of the external control rod 361 which protrudes to the outside of the cylinder 100 and is exposed to the outside, the valve interference unit 330 or the interference fixing unit 350 rotates and moves upward or downward. That is, the shock absorber disclosed in the present disclosure allows the user to control the range of changes of the valve 230 by simply manipulating the external control rod 361 exposed to the outside of the cylinder 100. As another example, the external control rod 361 and the valve interference unit 330 or the interference fixing unit 350 may be integrally combined with each other.

When described in more detail with reference to the external controller 360 disclosed in FIG. 1, the external control rod 361 is formed as a tube body having a diameter larger than the diameter of the interference guide 320, and includes a protrusion which partially protrudes at a lower end thereof. The external controller 360 includes a compression external control rod 362a corresponding to the interference guide 320 of the interference controller 310 disposed above the valve seat 210. In addition, the external controller 360 may include an expansion external control rod 326b. The expansion external control rod 326b is formed in a tubular body sized to be inserted into the inside of the compression external control rod 362a and a control hole 364, is formed longer than a length of the compression external control rod 362a so that an upper end thereof always protrudes from above the expandable external control rod 362b to be exposed to the outside, has a protruding surface which is formed at a lower end and has a diameter larger than that of the control hole 364, and includes a protrusion protruding upward from the upper surface of the protruding surface. This external controller 360 individually operates the compression external control rod 362a and the expansion external control rod 362b, and thus, can individually control the interference controller 310 disposed above the valve seat 210 and another interference controller 310 disposed below the valve seat 210. That is, the damping force can be individually controlled during the expansion stroke and the compression stroke of the cylinder 100.

The fixing cap 900 may include the fixing protrusion 910 which protrudes from the side surface exposed to the outside of the external control rod 361 and the fixing portion 920 which is formed to surround the external control rod 361 and is caught by the fixing protrusion 910. The fixing cap 900 maintains a state where the external control rod 361 is separated from the external control groove 363 so that the external control rod 361 is inserted into the external control groove 363 from external shock or vibration and does not rotate.

In more detail, the fixing cap 900 includes the fixing portion 920 configured as a groove into which the fixing protrusion 910 is inserted. A lower end of the fixing cap 900 is in contact with the upper surface of the cylinder 100, and the state where the external control rod 361 is separated from the interference controller 310 disposed on the valve seat 210 through the fixing protrusion 910 supported by the fixing portion 920 is maintained. Here, the fixing cap 900 can be freely moved upward, but cannot move downward.

Furthermore, as in the embodiment disclosed in FIG. 1, when the compression external control rod 362a and the expansion external control rod 362b are implemented together, the fixing portion 920 is formed in three places, and the fixing protrusion 910 may be formed in each of the compression external control rod 362a, the expansion external control rod 362b, and the upper end of the cylinder 100.

Meanwhile, a general stopper may be implemented instead of the fixing cap 900.

From the above, various embodiments of the present disclosure are described for illustration, and it will be understood that there are various possible modifications without departing from the scope and spirit of the present disclosure. Moreover, the disclosed various embodiments are not intended to limit the spirit of the present disclosure, and the true spirit and scope will be presented from the following claims.

According to the shock absorber disclosed in the present disclosure, the damping force or the spring constant is controller through the performance controller, and thus, performance of the shock absorber can be controlled to desired performance of a user.

In addition, according to the shock absorber disclosed in the present disclosure, the damping force or the spring constant of the shock absorber can be optionally controlled through the valve interference unit, the volume changer, and the filling valve. Therefore, it is possible to control the performance of the shock absorber desired by the user according to the purpose of use and in detail.

Furthermore, according to the shock absorber disclosed in the present disclosure, the valve can be separated from the passage through the interference coupler. Therefore, a compression passage and an expansion passage can be complemented without distinction according to the control of the user, and thus, it is possible to freely change the performance of the shock absorber.

The above description provides only an optional concept in a simplified form for matters to be described in more detail later. The present disclosure is not intended to limit the main features or essential features of the claims or to limit a scope of claims.

What is claimed is:

1. A shock absorber comprising:
   a cylinder which is filled with a fluid;
   a piston valve which includes a valve seat dividing an inner space of the cylinder, a passage which is formed in the valve seat and through which the fluid passes, and a valve disposed to cover the passage and interfering with a flow of the fluid;
   a performance controller which is disposed in the cylinder to control at least one of a spring constant, a damping force, or a combination thereof;
   a piston support which is connected to the piston valve and exposed to an outside,
   wherein the performance controller is an interference controller which is disposed in the piston valve and controls the valve interfering with the flow of the fluid,
   wherein the interference controller includes
      a valve interference unit which is disposed inside the cylinder to freely move and controls a range of change of the valve,
      an interference guide which is disposed inside the cylinder to guide the valve interference unit in a direction in which the valve is changed, and
      an interference fixing unit which is disposed to be in contact with the valve interference unit to fix the valve interference unit; and
      an external controller of which one side is inserted into the cylinder to rotate freely and rotates the valve interference unit or the interference fixing unit from an outside of the cylinder.

2. The shock absorber of claim 1, wherein the valve interference unit includes an interference limiter which is in contact with a surface in the direction in which the valve is changed so that the valve is changed up to the interference fixing unit.

3. The shock absorber of claim 1, wherein the valve is configured to be separated from the valve seat, and the valve interference unit includes an interference coupler which is freely moved by combining with the valve so that the valve is separated from the valve seat to the interference fixing unit.

4. The shock absorber of claim 1, wherein the interference fixing unit includes an interference male thread formed in the interference guide, and an interference female thread formed in the valve interference unit to correspond to the interference male thread, and
   the valve interference unit moves according to a screwing direction.

5. The shock absorber of claim 1, wherein the interference fixing unit includes an interference male thread formed in the interference guide, a limiting fixing protrusion formed to be in contact with the valve interference unit, and an interference female thread formed in the limiting fixing protrusion to correspond to the interference male thread, and
   the limiting fixing protrusion moves according to a screwing direction.

6. The shock absorber of claim 1, The interference controller includes an elastic body including an interference female thread and forming a part of the interference fixing unit.

7. The shock absorber of claim 1, wherein the external controller includes an external control rod, and
   the external control rod includes a compression external control rod which is formed of a tube body and corresponds to the valve interference unit or the interference fixing unit disposed above the valve seat, and an expansion external control rod which is inserted into the compression external control rod to pass through the valve seat and corresponds to another valve interference unit or interference fixing unit disposed below the valve seat.

8. The shock absorber of claim 7, further comprising:
   a fixing protrusion which protrudes to a side surface exposed to an outside of the external control rod; and
   a fixing cap which surrounds the external control rod and includes a fixing portion which is caught on the fixing protrusion.

9. The shock absorber of claim 1, wherein the performance controller includes a volume changer which is disposed on a side surface of the cylinder and freely moves inside the cylinder, and a spring constant is changed according to a volume change inside the cylinder.

10. The shock absorber of claim 1, wherein the performance controller includes a filling valve which is disposed on a side surface of the cylinder and communicates with an inside of the cylinder so that the cylinder is filled with the fluid, and a spring constant is changed according to a pressure of a gas generated by the injected fluid.

11. The shock absorber of claim 1, wherein the piston valve further includes a pressure reducing valve to prevent an increase in damping force.

* * * * *